L. B. WHIPPLE.
WOOD HEEL SEATING MACHINE.
APPLICATION FILED AUG. 4, 1919.
1,429,309.
Patented Sept. 19, 1922.
8 SHEETS—SHEET 3.
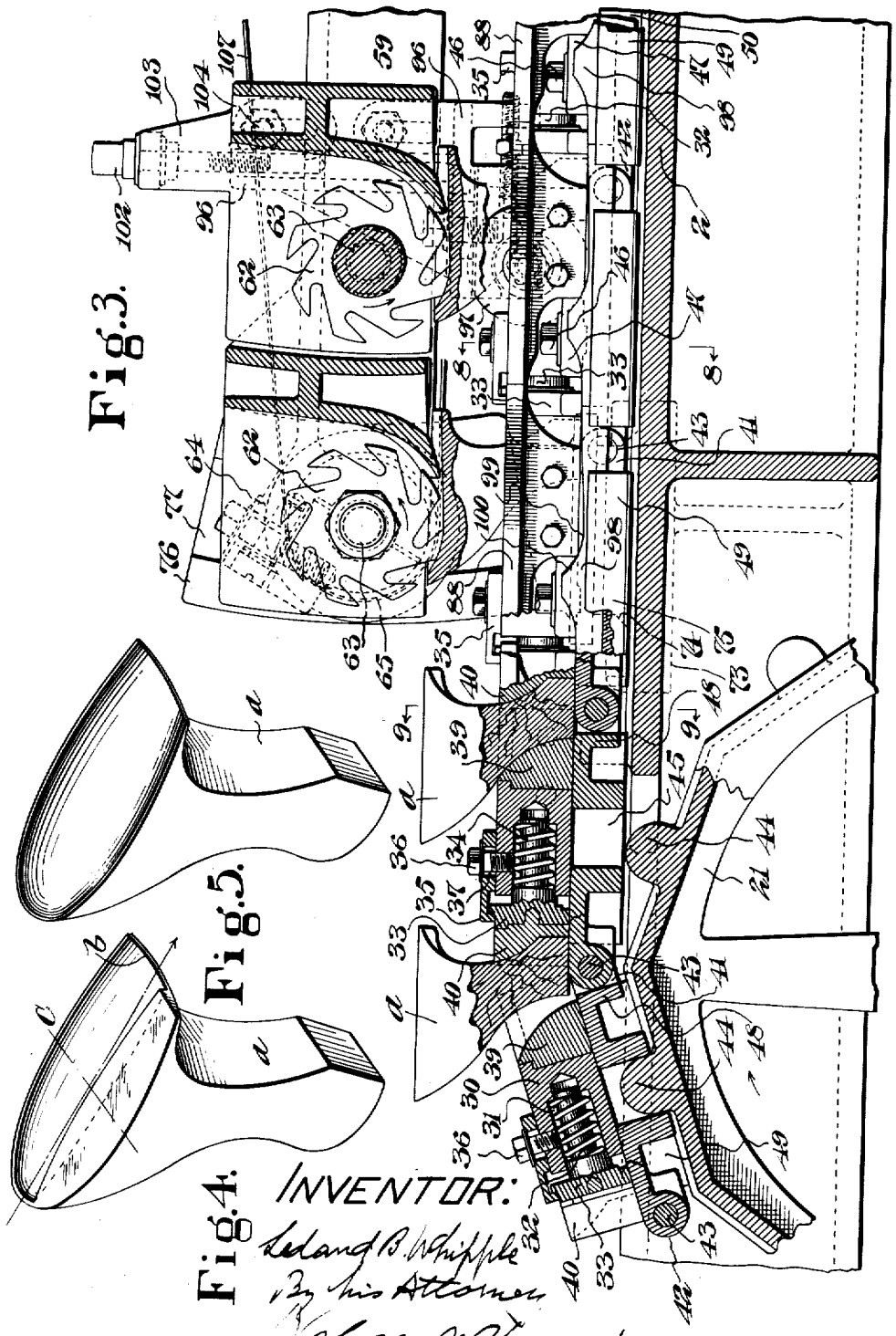

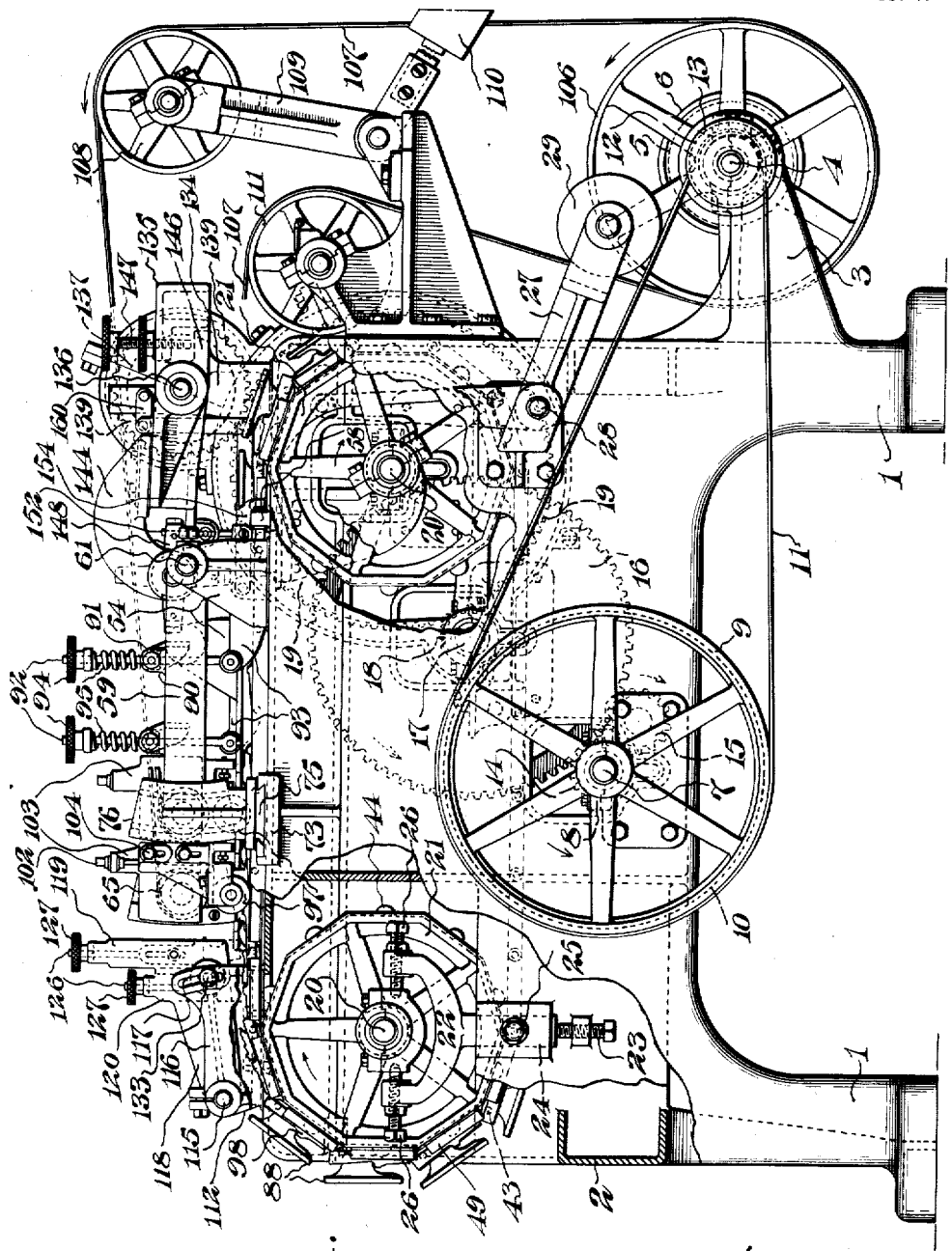

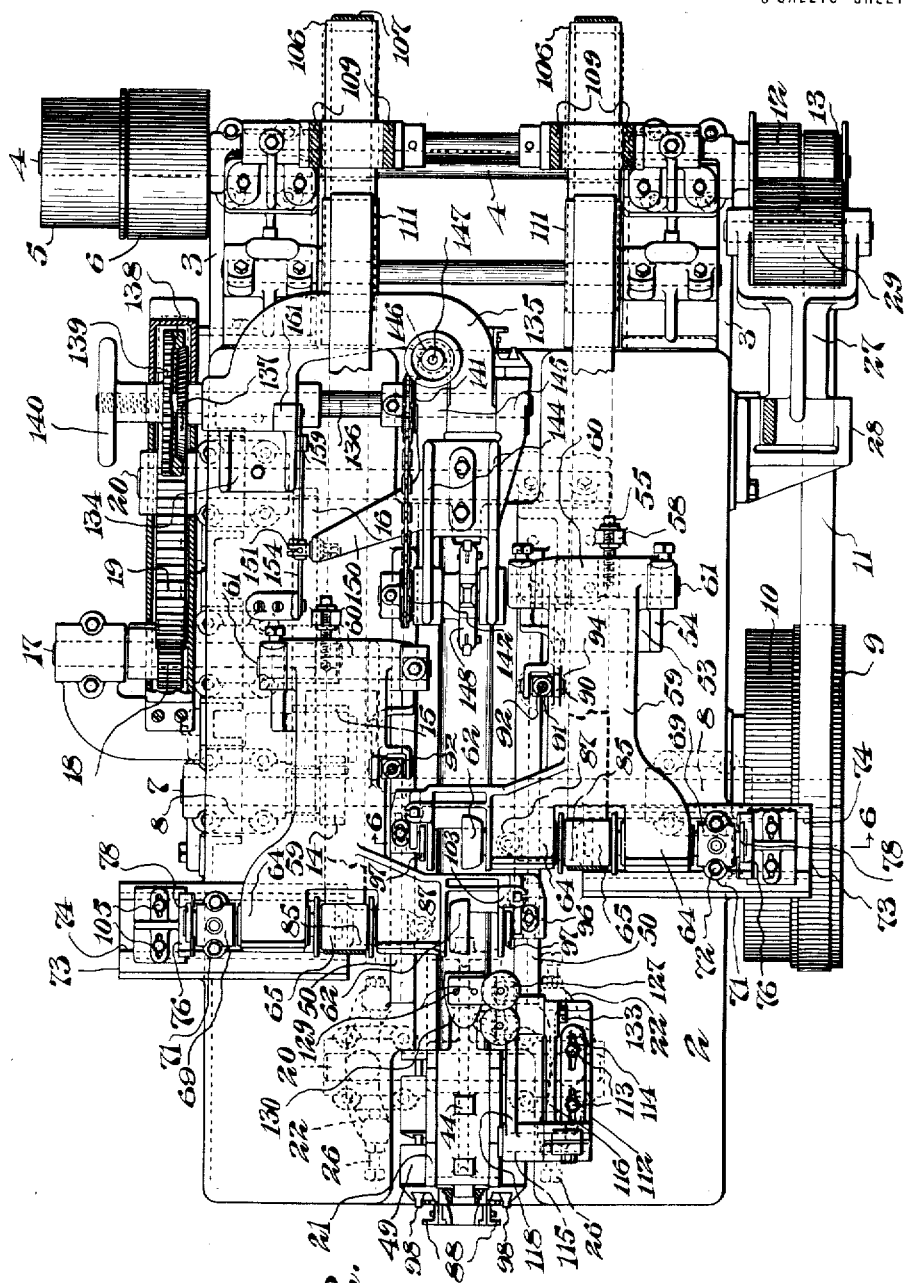

L. B. WHIPPLE.
WOOD HEEL SEATING MACHINE.
APPLICATION FILED AUG. 4, 1919.
1,429,309.
Patented Sept. 19, 1922.
8 SHEETS—SHEET 4.
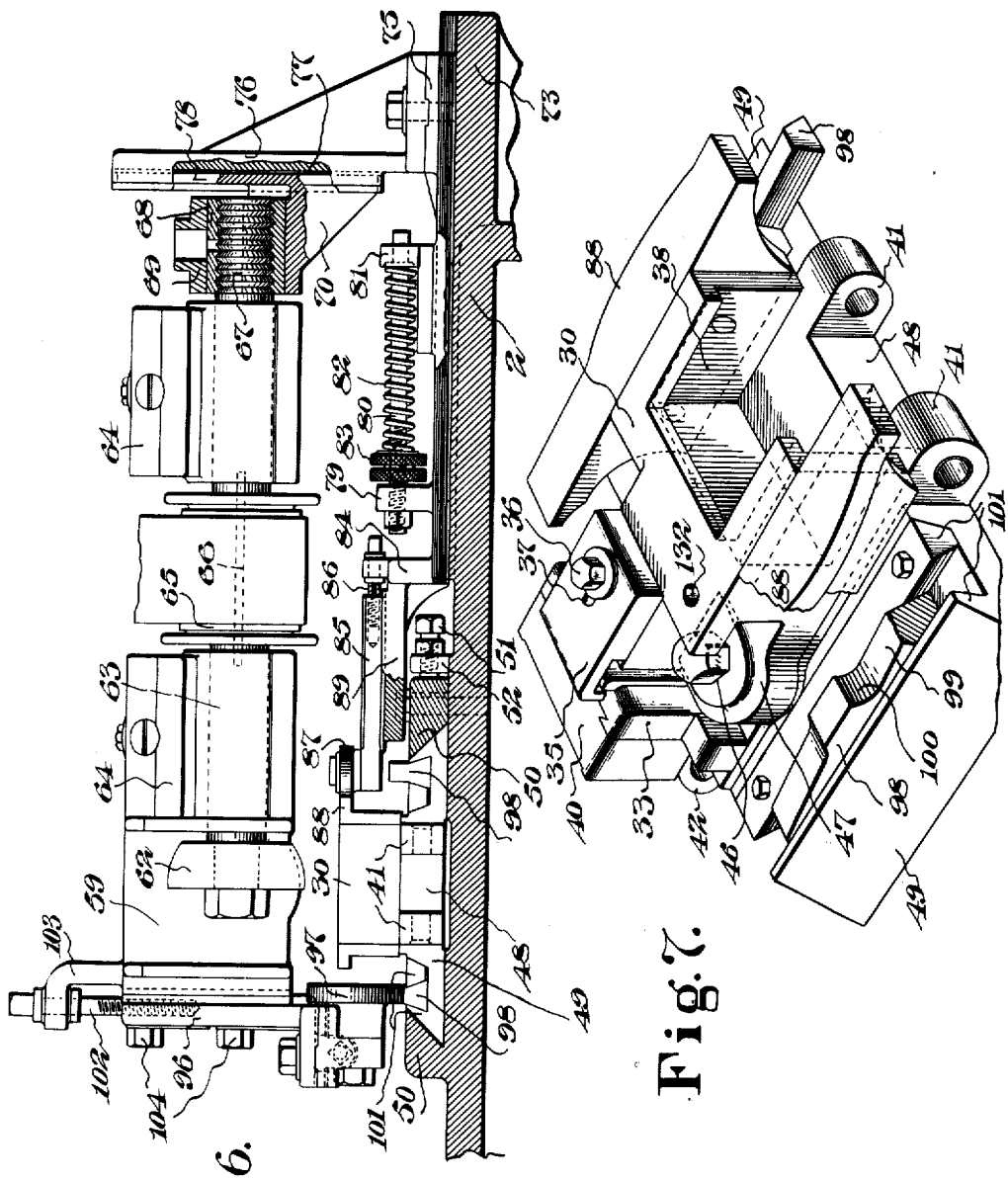
INVENTOR:
Leland B. Whipple
By his Attorney
Nelson W. Howard

L. B. WHIPPLE.
WOOD HEEL SEATING MACHINE.
APPLICATION FILED AUG. 4, 1919.

1,429,309.

Patented Sept. 19, 1922.
8 SHEETS—SHEET 5.

INVENTOR:
Leland B. Whipple
By his Attorney,
Nelson W. Howard

L. B. WHIPPLE.
WOOD HEEL SEATING MACHINE.
APPLICATION FILED AUG. 4, 1919.

1,429,309.

Patented Sept. 19, 1922.
8 SHEETS—SHEET 7.

INVENTOR.
Leland B. Whipple
By his Attorney
Nelson W. Howard

L. B. WHIPPLE.
WOOD HEEL SEATING MACHINE.
APPLICATION FILED AUG. 4, 1919.

1,429,309.

Patented Sept. 19, 1922.
8 SHEETS—SHEET 8.

INVENTOR:
Leland B Whipple
By his Attorney,
Nelson W. Howard

Patented Sept. 19, 1922.

1,429,309

UNITED STATES PATENT OFFICE.

LELAND B. WHIPPLE, OF ROCHESTER, NEW YORK, ASSIGNOR TO FITZ-EMPIRE DOUBLE PIVOT LAST COMPANY, OF AUBURN, MAINE, A CORPORATION OF MAINE.

WOOD-HEEL-SEATING MACHINE.

Application filed August 4, 1919. Serial No. 315,082.

*To all whom it may concern:*

Be it known that I, LELAND B. WHIPPLE, a citizen of the United States, residing at Rochester, in the county of Monroe and State of New York, have invented certain Improvements in Wood-Heel-Seating Machines, of which the following description, in connection with the accompanying drawings, is a specification, like reference characters on the drawings indicating like parts in the several figures.

This invention relates to machines for making heels for boots and shoes, and more particularly for forming a concavity in the top or heel seat portions of boot and shoe heels to conform to the shape of the shoe parts to be seated thereon.

The heel portion of boots and shoes is made to conform approximately to the heel of the human foot by the shape of the last on which the shoe parts are assembled. This produces a rounded convex form to the sole and upper materials at the heel to which the top of a leather heel is usually made to roughly conform by a cavity formed by compression or by a "rand" or edge strip, or both. In the manufacture of wooden heels, however, it is the practice to dispense with the rand and form the desired seat in the top or "heel seat" by a concavity formed by cutting out or removing a part of the heel itself. At the front or "breast" of the heel this concavity takes the general form of a cylindro-elliptical contour cross-wise of the heel and gradually widens laterally between the bulging sides of the heel until, at the back of the heel, it merges into an oblate spheroid terminating at the rear edge of the heel.

The formation of the concavity, thus generally described, presents practical difficulties more especially emphasized where the heel is made of wood, because the grain of the wood runs longitudinally of the heel between the breast and back of the heel, and any attempt to produce the cavity by a cutter acting across the grain of the wood at once produces objectionable results which manifest themselves in the roughly torn surface of the cavity itself and the breaking out or splintering of the wood at the sides and back edges of the heel. On the other hand, a single molded cutter shaped to produce the desired cavity at the front or breast of the heel and cutting with the grain of the wood, is unsuitable to produce the desired shape of cavity between the bulging side portions of the heel and the generally oblate spheroid terminating at the back edge of the heel.

An important feature of the present invention, therefore, consists of cutters acting longitudinally along the top of the heel to successively concave separate portions extending from the breast to the back of the heel. This feature of the invention is practically accomplished by molded cutters, which, in the case of wooden heels, act with the grain of the wood, each to cut a different portion from the top of the heel longitudinally thereof from breast to back, while relatively traversing the cutters and heel during the operation of the cutters.

Heels vary in width between the breast and back. They may be narrow at the breast and widen out along the sides, and then the edge portions gradually converge into a rounded contour at the back, or they may take other variations in shape about the heel seat. These conditions call for the adaptation of the cutters to respond to the requirements of the heel, and another important feature of the invention consists of means for imparting relative lateral or transverse movements to the heels and cutters to the end that, while the cutters act longitudinally of the heel to concave different portions extending between the breast and back, they may also respond to the variations in width between the breast and back and concave the top of the heel uniformly to and along the sides. In the present instance, the molded cutters are mounted for lateral movement while the heel is being traversed past the cutters, and such lateral movement of the cutters is automatically produced by pattern or cam means answering the requirements of width variation in the heel.

A uniform concavity in the heel seat requires that as the cutters are performing the described functions and are being moved laterally relative to the heel, they shall not leave a rib or uncut portion extending longitudinally along the top of the heel to be subsequently removed by an additional operation on the heel seat. Another important feature of the invention, therefore, consists in arranging the cutters with their adjacent cutting portions overlapping, so that even though the cutters be moved laterally in response to the varying width of the heel, the zone of action of the cutters will overlap transversely of the heel and effectively insure a smooth and uninterrupted concavity throughout the heel seat.

As the cutters progressively approach the back of the heel while cutting longitudinally along different portions of the top of the heel, the oblate spheroidal character of the cavity requires a modification in the relation of the heel and cutters. Another important feature of the invention, therefore, consists in relatively moving the cutters and heel in a direction heightwise of the heel as the cutters progressively approach the back of the heel. It is convenient to relate the cutters and carrier that the latter may travel in a rectilinear path beneath the cutters, and in this case the heightwise relative movement of the cutters and heels is obtained by vertical movement of the cutters as the heels are traversed past the cutters.

The heel carrier is of novel construction and provides for holding the heel about one end while exposing the top or heel seat to the action of the cutters, and since the sizes of heels vary, provision is made for the accommodation of heels of varying dimensions. An important feature of the invention in this respect consists in forming the carrier of a series of connected links and providing the adjacent ends of adjoining links with clamping portions between which one end of a heel may be clamped. In carrying this feature of the invention into practical effect, the chain-like carrier is passed about guides which deflect the chain sufficiently to open the clamping portions between adjacent links to permit the introduction or removal of a heel, and as the chain straightens out in its rectilinear path the clamping portions are automatically closed. Thus the heel to be treated may be introduced between the clamping portions of adjoining links as they flex or travel about an end guide and then be automatically clamped in the carrier for treatment by the cutters and automatically clamped in the carrier for treatment by the cutters and automatically discharged when the carrier passes about the other guide after the concave heel seat has been formed.

Another feature of the invention, which is of much importance where the same machine is to be used for treating greatly varying styles and sizes of heels, consists in changeable clamping blocks which constitute the clamping portions for the heel between adjoining links. These blocks may be formed of any suitable material capable of initially adapting itself to the predetermined size or style of heel to treated, and in the present instance of the invention, are formed of Babbitt metal which is put in place about the end of a master heel conforming to the size and style of heels to be treated. To effectively mold the metal into proper shape, the chain or carrier and the master heel are locked in predetermined position with the links of the chain in alinement, and then the Babbitt metal is placed in the adjacent ends of adjoining links about the end of the master heel, which is later removed.

Other features of the invention and novel combinations of parts are contemplated, and these, together with those hereinbefore outlined, will be hereinafter more fully described, and the novel features of the invention will be defined in the claims.

In the drawings:

Fig. 1 is a side elevation of a machine containing the present invention, some of the parts being broken away;

Fig. 2 is a plan view;

Fig. 3 is an enlarged sectional elevation of one end portion of the machine shown in Fig. 1, more particularly showing the heel carrier, the rotary cutter heads and associated parts;

Fig. 4 is a view on an enlarged scale showing a heel after one of the cutters has performed its cutting operation longitudinally of the top of the heel;

Fig. 5 is a view similar to that of Fig. 4 showing the heel with the finished heel seat formed by the cutters;

Fig. 6 is an enlarged section taken on the line 6—6 Fig. 2, some of the parts being shown in elevation;

Fig. 7 is a detached detail perspective view of one of the heel carrier links;

Figure 8:
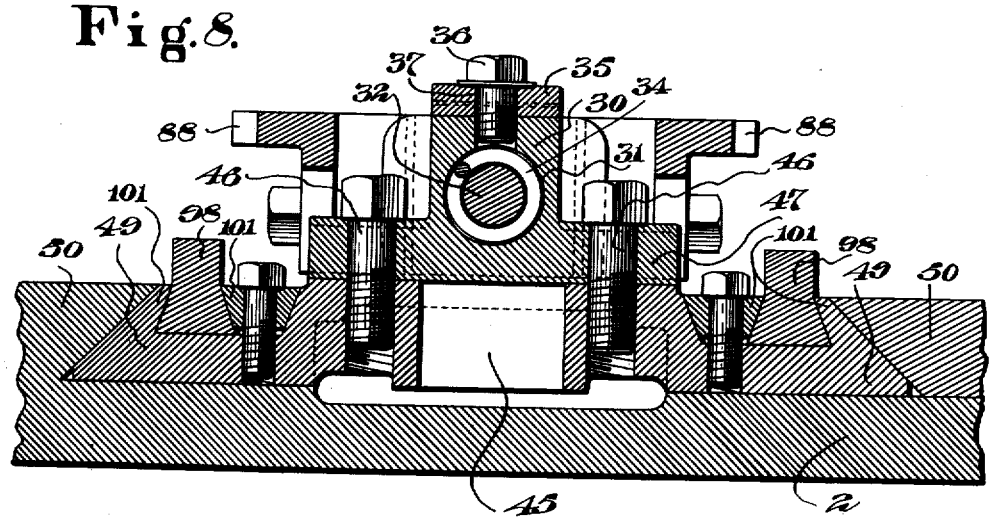
Fig. 8 is an enlarged section on the line 8—8 of Fig. 3, showing more particularly the construction of the chain carrier links.
Figure 9:
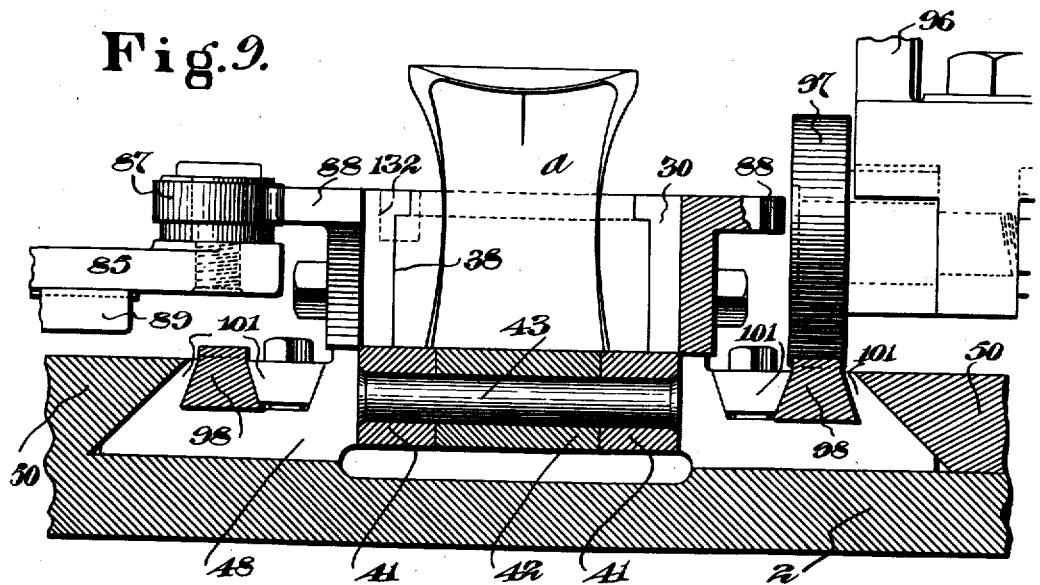
Fig. 9 is an enlarged cross section on the line 9—9 of Fig. 3.

The machine frame for supporting the operating parts may be of appropriate character and as herein shown comprises the leg portions 1 on which is surmounted the body frame 2 which may be provided with a longitudinal guide-way for the heel carrier, as will more fully appear.

The main frame has projecting therefrom the brackets 3, Fig. 1, carrying suitable bearings for the drive shaft 4 on which are mounted the fast and loose pulleys 5 and 6 by which the drive shaft 4 may be operated from a suitable source of power, such as belting from a line shaft, for instance. A driven shaft 7 extends transversely of the machine frame, as indicated in Figs. 1 and 2, and is mounted in appropriate bearings 8 secured to the main supporting frame. The shaft 7 carries the pulleys 9 and 10 which may be driven by a belt 11 connecting one of said pulleys to corresponding pulleys 12 and 13 on the drive shaft 4, the construction being such that upon rotation of the drive shaft 4 the driven shaft 7 will be actuated through the described connections.

The shaft 7 has secured thereto a gear 14, Fig. 1, which, through a suitable train of mechanism, as will presently appear, serves to actuate the heel carrier. The particular train of mechanism to accomplish this purpose, in the present instance, consists of an idler 15 meshing with a transmission pinion 16 mounted on the transverse shaft 17, Fig. 1. The shaft 17 has the gear 18 secured thereto which is in driving connection with the pinion 19 on the carrier feed shaft 20.

At each end portion of the machine frame is mounted a carrier feed shaft 20 on which is secured the guides 21 about which the carrier is guided as it is moved to present the heels for the cutting operation. In the present instance of the invention, the shafts 20 are mounted in yokes 22, Fig. 1, which may be adjusted vertically by suitable adjusting means, such, for instance, as the adjusting screw 23 threaded through a lug carried by the main frame and bearing upon the yoke support 24. A clamping bolt 25, Fig. 1, serves to secure the yoke 22 in adjusted position. In order to adjustably control the distance apart of the guides 21 about which the carrier passes, the bearings for the shafts 20 are engaged by suitable adjusting bolts 26, Fig. 1, whereby, upon proper manipulation of the bolts, after first loosening the lock nuts, the shafts 20 may be adjusted towards and from each other and then secured in adjusted position. The guides 21, hereinbefore mentioned, consist of plural sided wheels mounted upon the shafts 20 and adapted to support the links of the heel carrier, so that, as the carrier is moved to present the heels to the action of the cutters, to be hereinafter described, the links of the carrier will conform substantially to the faces of the guides or wheels 21. If desired, a belt tightener may be employed for maintaining the belt 11 in driving engagement with the pulleys between which it extends, as represented in Fig. 1, the belt tightener in the present instance consisting of an arm 27 pivotally mounted at 28 and carrying the roller 29 adapted to bear on the upper run of the belt 11.

As hereinbefore stated, the heels are to be presented to the cutting mechanism or cutter heads with the top or heel seat portion of the heels exposed to the action of the cutters, and in the case of wooden heels the cutting action of the cutters is designed to be with the grain of the wood. It is therefore expedient at this time to describe the carrier whereby the heels are fed or moved or presented to the cutting mechanism. In the present instance, the carrier is formed of a series of links pivotally connected together and adapted to pass about the two guides or wheels 21, heretofore described, and clamping devices are associated with the carrier to embrace about one end of the heel and present the top or heel seat to the action of the cutters. The clamping devices are provided at the adjacent ends of adjoining links of the carrier, and as the carrier passes about the guides 21, and the links are thereby deflected from a rectilinear path, the adjacent ends of adjoining links open up or separate to permit a heel to be placed in the carrier and clamp the heel as the carrier straightens out in its rectilinear path extending by the cutters. Each link of the carrier may be substantially the same and therefore a description of one will suffice for all.

Each link of the carrier comprises a body portion 30, Figs. 3 and 7, having a socket 31 in which is mounted the stem 32 of a clamping portion 33 to which the stem may be appropriately secured in any suitable manner, in which, in the present instance, is formed integral therewith. A spring 34 surrounds the stem 32, one end of the spring bearing against one end of the socket and the other end against the clamping portion 33, the construction being such that the spring normally tends to move the clamping portion 33 outwardly or into yielding clamping position. A limiting stop, formed by a plate 35 adjustably secured to the body portion 30 by a bolt 36 passing through a slot 37 in the stop, serves to limit the outward movement of the clamping portion 33 in response to the spring 34. The body portion 30 of the link has a chamber 38, shown more fully in Fig. 7, for receiving one end of the heel clamping blocks 39 to be hereinafter described. Similarly, the clamping portion 33 is formed with a holding notch for a clamping block 40 oppositely disposed to the first mentioned clamping block and carried by the adjacent end of the adjoining link, the construction being such that as the carrier passes about the guide 21 at one end of the machine frame, the adjacent ends of adjoining links of the carrier open up, as indicated in Fig. 3, for the reception of the tread end portion of a heel a, and as the carrier straightens out into its rectilinear path which it pursues during the operation of the cutters upon the heel, the clamping blocks 39 and 40 clamp the end of the heel between them with the top or heel seat portion of the heel exposed to the action of the cutters. At one end, each link is provided with suitable lugs 41, and at the other end with another lug 42, pivot pins being passed through the lugs 41 and the lug 42, of the adjacent end of the adjoining link.

The guides or wheels 21, hereinbefore described, are provided with projections 44, shown best in Fig. 3, which are adapted to engage suitable recesses 45 in the under portion of each of the links of the carrier, the construction being such that as the guide or wheel 21 rotates, it will traverse the heels clamped on the carrier past the cutters.

The body portion 30 of the links may be variously contrived, but in the present instance such portions are preferably made separate from the links themselves and secured thereto by bolts 46, Figs. 7 and 8, passing through extensions or lugs 47 formed on the body portion 30. The lower or main portion 48 of each link is extended laterally outward to form bevel guide portions 49, preferably one at each side of the link, and such guide portions are adapted to engage beneath the rabbets or guides 50 formed on the top portion of the machine frame, whereby the links of the carrier are guided and held firmly as the heels are being cut. If desired, one of the rabbets or guides 50, as indicated in Fig. 6, may be adjustably secured in position by means of an adjusting bolt 51 screw threaded into a lug 52 formed on the machine frame 2, thus accommodating means for taking up wear or for varying widths of carrier.

The cutters or cutter heads for forming the concave heel seat in the top portion of the heels, are supported to act upon different portions of the top of the heel extending from the breast to the back of the heel, and are actuated to perform the cutting operation in the direction of the grain of the wood as the heels and cutters are relatively traversed. The cutters and their respective mountings are similar, and therefore a description of one will suffice for both. Mounted upon the top of the machine frame 2 is a plate 53 carrying the upwardly projecting portions 54 and adjustably secured to the machine frame by the bolt 55 threaded into a lug 56 connected to the plate 53. The bolt 55 has the collared portions 57, one at each side of the slotted lugs 58, to prevent endwise movement of the bolt in the lugs whereby, upon manipulation of the adjusting bolt 55, the plate 53 and, perforce, the portions 54, may be adjusted longitudinally of the machine frame. A cutter head carrier 59 is mounted upon the portions 54, heretofore described, for rising and falling movement relative thereto. In the present instance the cutter head carrier or support 59 is provided with a bearing portion 60 through which passes the pivot bolt 61, Fig. 10, about which the carrier or support 59 may turn as an axis. The cutter or cutter head 62 is mounted upon a shaft 63, Figs. 6 and 10, extending transversely of the carrier or support 59 and capable of rotative movement and longitudinal axial movement to a limited extent, in the bearings 64. Between the bearings 64 which support the cutter shaft 63, is a belt pulley 65 splined to the cutter shaft 63, as at 66, the construction being such that while the pulley 65 will cause rotative movement of the cutter shaft and, perforce, of the cutter head connected thereto, said shaft may also have endwise movement relative to the pulley 65. The cutter shaft 63 is provided with grooves and projections 67, preferably located at one end of the shaft. and these engage complementary grooves and projections in a fixed collar 68 secured to a bearing 69 mounted on a bracket 70, Fig. 6. The bearing 68 may be fixed in position relative to the bracket 70 by any suitable means, as, for instance, by the lugs 71 extending from the bearing 69 and clamped about the collar 68 by means of a bolt 72, the construction being such that while the cutter shaft 63 may rotate freely under its actuating means, as hereinafter described, it is held from endwise movement in the fixed collar 68 which is itself secured in fixed position relative to the bracket 70.

As hereinbefore pointed out, and as shown by Figs. 4 and 5, the top or tread surface of heels varies in width from breast to rear; means are therefore provided for giving to the cutter or cutter head movements transversely of the heel to accord with the varying width between breast and back, as the heel passes the cutter. Towards the back of the heel the side edges turn inwardly and merge into a continuous curve about the back of the heel, the form of the cavity towards the rear of the heel, therefore, partakes generally of the form of an oblate spheroid, and means are herein provided for relatively moving the cutter or cutter head and heel in a direction heightwise of the heel as the cutter progressively cuts towards the back of the heel. In the present instance of the invention, these dual movements of the cutter and cutter head are controlled by the heel carrier, as will now be explained.

Figure 10:
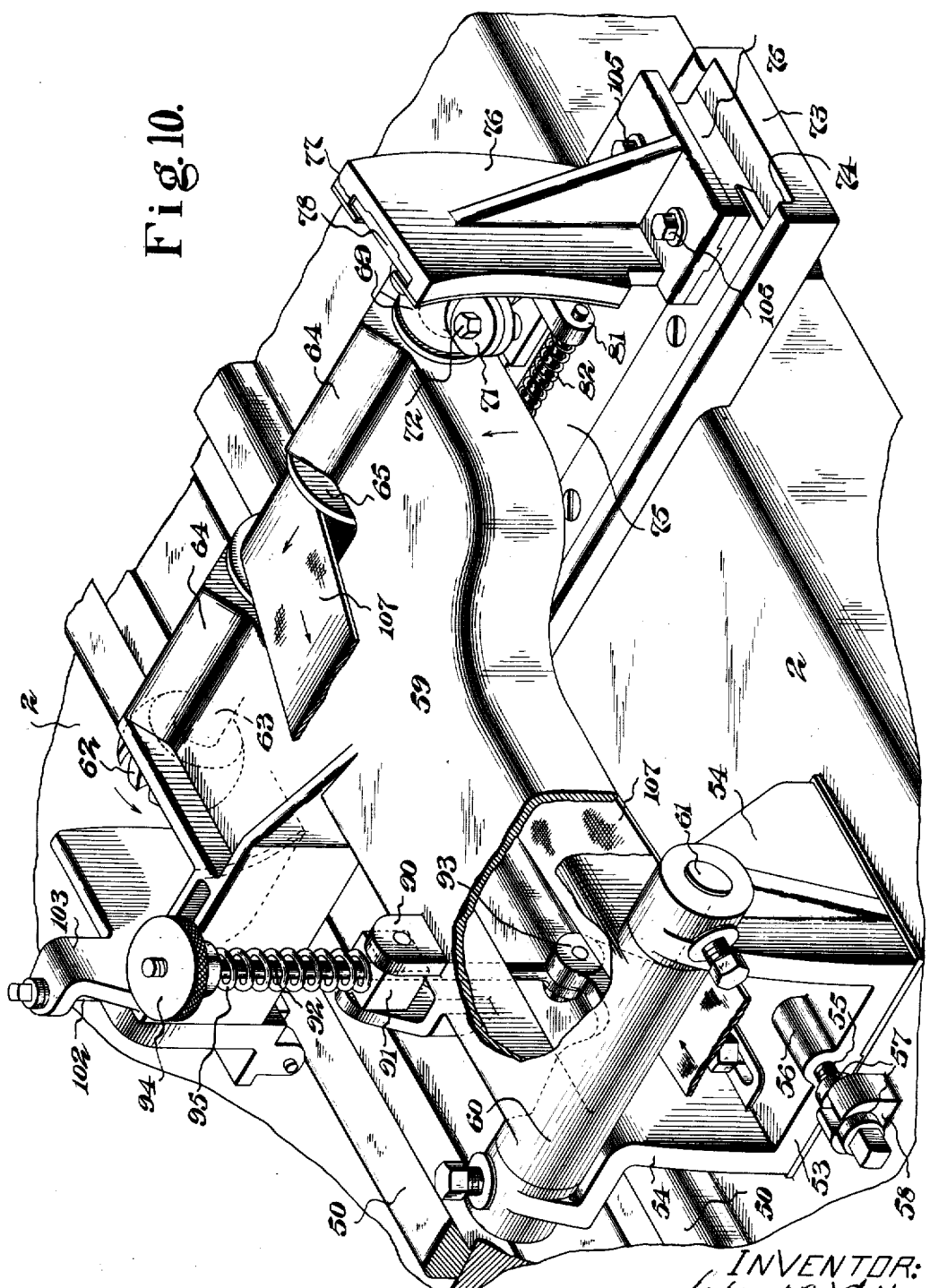
Fig. 10 is an enlarged perspective view showing the cutter head support and its association with cooperating parts.

Secured to the top of the machine frame 2 is the guide-way 73 located approximately below the cutter shaft 63 and extending transversely to the path of travel of the heel carrier. The guide 73 has dove-tailed portions 74, one of which may be removable, for the reception of the fan-tail guide portion of a transversely movable slide 75. Secured to the transversely movable slide 75 and rising therefrom, is the bracket 76 provided with a slot 77 formed in the arc of a circle with the axis 61 as a centre. Mounted for sliding movement in the arc-shaped slot 77 is a slide 78 which carries the bracket 70, the construction being such that while the bracket 70 may move up or down relative to the bracket 76, it is constrained for lateral movement with the bracket 76, as indicated in Figs. 6 and 10. The transversely movable slide 75 is normally under the influence of yielding means, such as a spring, tending to move the slide transversely of the machine frame or path of travel of the heel carrier, and the amount of sliding movement thus permitted the transversely movable slide 75, is under control of cam means mounted on the heel carrier. The slide 75 has projecting therefrom a lug 79 to which is secured one end of a rod 80, the other end of which passes loosely through a lug 81 fixed relative to the machine frame. A spring 82 surrounding the rod 80 bears at one end against the fixed lug 81 and, at its other end, against an adjustable collar 83, preferably threaded to the rod 80, the construction being such that the normal tendency of the spring 82 is to move the transversely movable slide 75 inwardly or to the left, Fig. 6. Rising from the slide 75 is another lug 84, to the upper end portion of which is connected an arm 85 by means of an adjusting screw 86, and the arm 85 carries a roller 87 adapted to bear against a cam 88 mounted on the heel carrier, the construction being such that the slide 75 is normally under the control of the spring 82, which, however, may yield under the dictates of the controlling cam 88. In order that the arm 85 may be held in proper position while adjustably connected to the lug 84, the lug has projecting therefrom the guide 89, Fig. 6, by which the arm 85 is directed in its lateral movements. From the construction thus far described, it will be apparent that as the heel carrier traverses the heels past the cutter, the latter will be moved transversely relative to the heel, under the control of the pattern or cam means 88 mounted on the heel carrier, and as the width of the heel varies from the breast *b* along the sides to the wider part *c*, Fig. 4, and then narrows again towards the back, the cutter or cutter head may be caused by the means described, to follow the prescribed path laterally of the top of the heel or heel seat.

The carrier or support for the cutter head is normally under the influence of a yielding means, such as a spring, tending to depress the cutter or move it vertically, in the illustrated form of the invention, and hold it in cutting relation with the top of the heel. To this end a support or arm 59 is provided with lugs 90, more clearly indicated in Fig. 10, to which is pivotally connected the block 91 through which loosely passes the pin 92 pivotally connected at its lower end to a lug 93 secured to or connected with the plate 53. Adjustably connected to the top of the pin 92 is a thumb piece 94 between which and the block 91 is interposed the spring 95, the construction being such that the spring 95 normally acts through the block 91, to depress the cutter or cutter head.

To provide for the upward movement of the cutter or cutter head, as it progresses towards the back of the heel, as is required by the form of the concavity at this portion of the heel, pattern or cam means are provided on the heel carrier which coact with means connected to the arm or support 59, as will now be explained.

Adjustably mounted upon the arm or support 59 which carries the cutter or cutter head, is a slide 96 which carries at its lower end a roller 97 adapted to ride upon the top surface of a pattern or cam 98 secured to the heel carrier, as indicated in Fig. 6. The form of the cam 98 is such, as illustrated in Fig. 7, that while the cutter or cutter head is operating upon the front or breast portion of the heel, the roller 97 will be permitted to drop to the desired extent by the low portion 99 of the cam 98, and as the cutter progresses toward the rear of the heel, the formation of the pattern or cam 98 is such, as at 100, Fig. 7, to gradually lift the cutter head to enable the desired form of concavity to be produced, and lift the cutter clear of the work as the back edge portion of the heel passes under the cutter. The lifting cams 98 may be variously secured to the wheel carrier, but as illustrated in the present instance, they are formed with downwardly and outwardly inclined portions which underlie overhanging portions 101 of the carrier, one of such portions being preferably formed removable to permit cams of different forms to be substituted in accordance with the particular shape of the cavity to be formed in the heel seat.

The slide 96 may be adjustably connected to the arm 59 by means of a bolt 102, Fig. 6, threaded into the slide and held from longitudinal movement by collars engaging with a lug 103 rising from the arm 59. When in desired adjusted vertical position the slide 96 may be fixed to the carrier 59 to permit its movement under the dictates of the cams 98, by means of the securing bolts 104.

It is desirable preliminarily to the operation of the machine upon heels, to adjust the cutter heads relative to each other and to the heels to be presented by the carrier for treatment. One of such adjusting means has already been described in connection with the arm or yoke 59 carrying the cutter head. As the plate 53 is adjusted, as hereinbefore described, it is necessary to likewise adjust the bracket 76 and this is effected, as indicated in Fig. 10, by the adjustable connection through the bolts 105 of the bracket 76 to the transversely movable slide 75.

The cutters or cutter heads are supported one in front of the other relative to the traverse of the heels in order that the cutters may act successively upon the different portions of the tops of the heels extending between the breast and the back of the heels, and since the cutters or cutter heads are given hereinbefore described transverse movement relative to the heels as they progressively cut from the breast towards the back of the heels, the present invention contemplates the insurance of complete formation of the concavity of the heel seat by arranging the cutters with adjacent end portions in overlapping relation to an extent sufficient to insure the removal of the material throughout the width of the heel. This relative adjustment of the cutters or cutter heads to insure their sufficient overlap, may be variously contrived, and as illustrated in the present instance, is obtained by the adjustable connection 86 between the transversely movable slide 75 and the arm 85 carrying the roller 87, Fig. 6.

The cutter shafts, as already described, are mounted to turn about horizontal axes and are rotated by suitable means from the driving shaft. In the present instance of the invention the driving shaft 4 has secured thereto the pulleys 106, Figs. 1 and 2, and about each of these pulleys passes a belt 107 leading over guiding and belt tightening pulleys 108 mounted on the arms 109 which are under the influence of belt tightening weights 110. From the pulleys 108 the belts 107 pass over the pulleys 65, heretofore described as mounted on the cutter head shafts 63, to rotate therewith. On its backward travel the belts 107 pass over the guide pulley 111, Fig. 1, the construction being such that while the cutters may be moved as hereinbefore described, the driving belt connection with the source of power does not interfere with their proper movement.

The description hereinbefore given with respect to the construction and mode of operation of one cutter, or cutter head, applies with equal force to the other, and, in the illustrated form of the invention, two molded cutters are employed, each of which cuts in the direction of the grain of the wood upon different portions of the heel seat extending from breast to back of the heel and each removes substantially one-half of the material at the top of the heel, but it is evident that the number of cutters might, under certain conditions, be varied. Likewise with respect to the pattern or cam means of the heel carrier for controlling the position of the cutters transversely and heightwise of the heels, it is to be understood that there are two sets of such pattern or cam controlling means in the present instance of the invention, each controlling one of the cutters.

Figure 12:
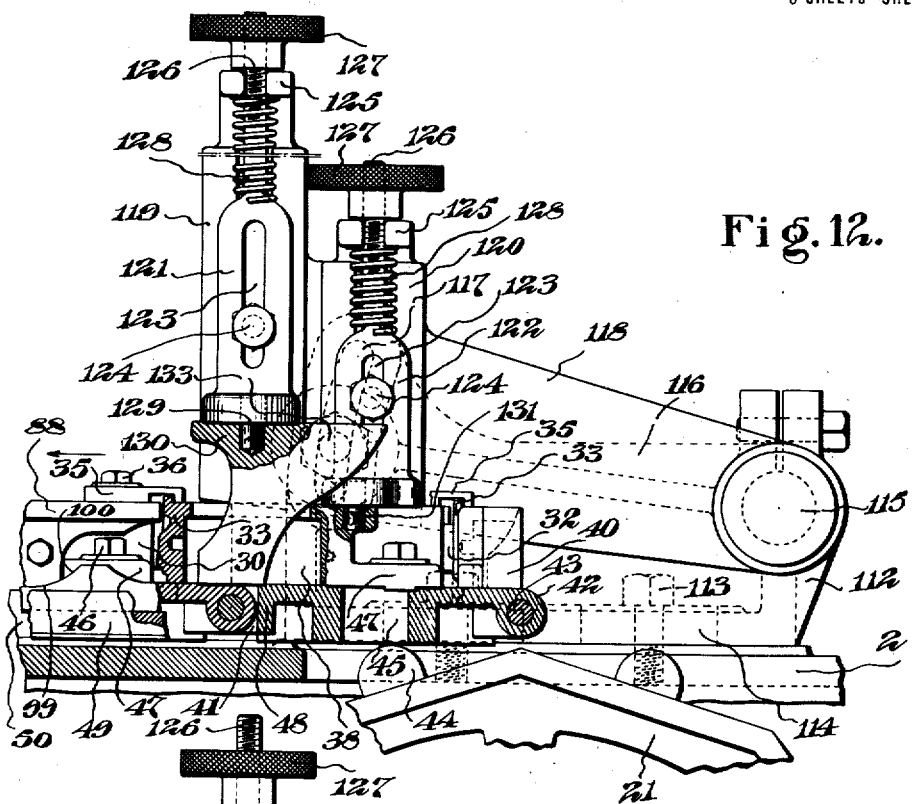
Fig. 12 is an enlarged side elevation, parts being shown in section, of the master heel and the locating means for the master heel and carrier for contriving the clamping blocks for the heel.
Figure 13:
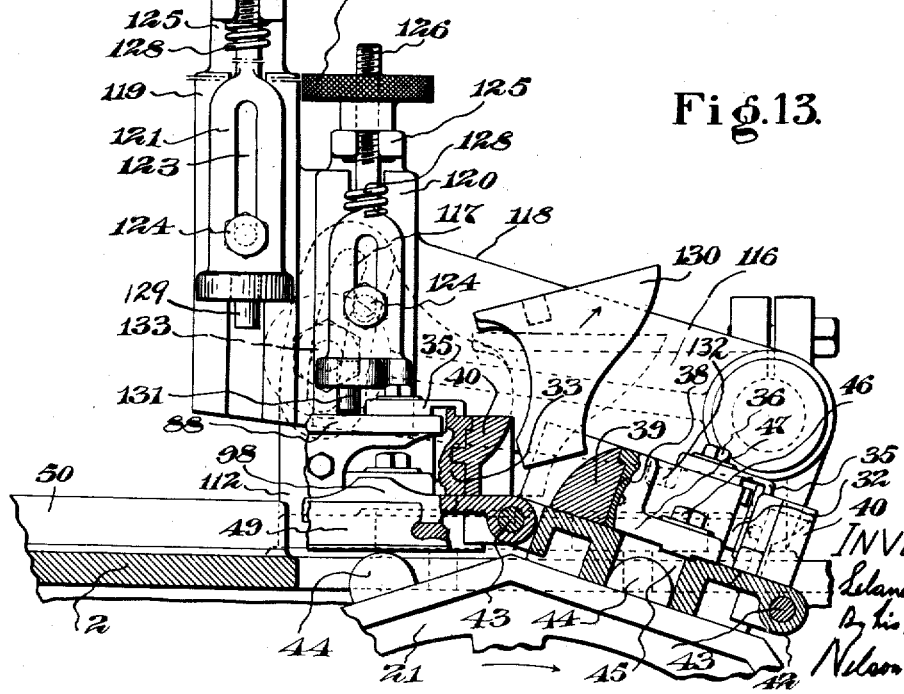
Fig. 13 is a similar view in side elevation, with parts broken away showing the master heel being removed after the clamping blocks have been placed in the carrier.

Heels differ in size and styles, and, consequently, while the clamping blocks mounted in the links of the heel carrier, are adapted to clamp and support heels of one size, or even heels which vary slightly in size, yet it becomes necessary to provide different sizes of clamping blocks to accommodate a series of heels to be treated. To meet this condition the present invention contemplates means for changing the clamping blocks as circumstances dictate. To provide clamping blocks of an appropriate size to conform to a series of heels to be treated, a "master heel," preferably formed of metal or other suitable substance, is employed to determine the size and shape of the blocks. Adjustably secured to the top 2 of the machine frame, preferably adjacent the leading guide or roller 21, is a bracket 112 which may be adjustably secured to the top 2 of the machine frame by adjusting bolts 113 passing through slots 114 in the bracket. The bracket 112 carries the stud 115 to which may be clamped the arm 116 having at its end portion the arc shaped slot 117. Also mounted on the stud 115 is the arm 118 which may be moved about the stud 115 as an axis. The arm 118 carries the two guiding and supporting members 119 and 120, each provided with a slide member 121, 122, respectively, provided with the slots 123 and clamping bolts 124 whereby they may be secured in desired vertical position. The supports 119, 120, have lugs 125 through which passes the adjusting stem 126 connected to each of the slide members 121, 122, respectively. Above the lugs 125 on each of the supports, is a threaded thumb nut 127 whereby the slide members 121, 122, may be adjusted upwardly in opposition to the springs 128, and when in adjusted position may be secured by the clamping bolts 124. The slide member 121 has a head portion from which projects a positioning pin 129 adapted to engage an opening in the master heel 130 and maintain the master heel in fixed position between the adjacent ends of adjoining links, as indicated in Fig. 12. The head on the slide member 122 is provided with a pin 131 which is adapted to engage a socket 132 in a link of the chain, the construction being such that when the pins 129 and 130 are engaged in their respective sockets of the master heel and carrier link, the carrier will be held in a predetermined position and the master heel will be held in corresponding predetermined position between the adjacent ends of adjoining links. While the parts are in the position described, and as indicated in Fig. 12, the clamping blocks of initially plastic or semi-plastic material, are either poured or worked into the space about the lower end of the master heel, and when such material becomes hardened it produces the desired form, size and shape of the clamping blocks. In order to remove the master heel without disturbing the relation of the clamping blocks 39 and 40, formed as above described, the slide members 121 and 122 are lifted to disengage the pins 129 and 131 from the master heel and heel carrier, respectively, whereupon the heel carrier may be moved backwardly about the guide or wheel 21 to deflect the links of the carrier and, perforce, separate the blocks, as indicated in Fig. 13, to permit removal of the master heel 130. This same operation will be performed with respect to the adjacent ends of adjoining links throughout the series, and when the clamping blocks have been formed as desired, the arm 118 may be swung upwardly about the axis 115 and held in its up or inoperative position by means of a clamping bolt 133 carried by the arm 118 and movable in the curved slot 117 of the fixed bracket member 116, and set up to hold the parts in the desired inoperative position.

Figure 11:
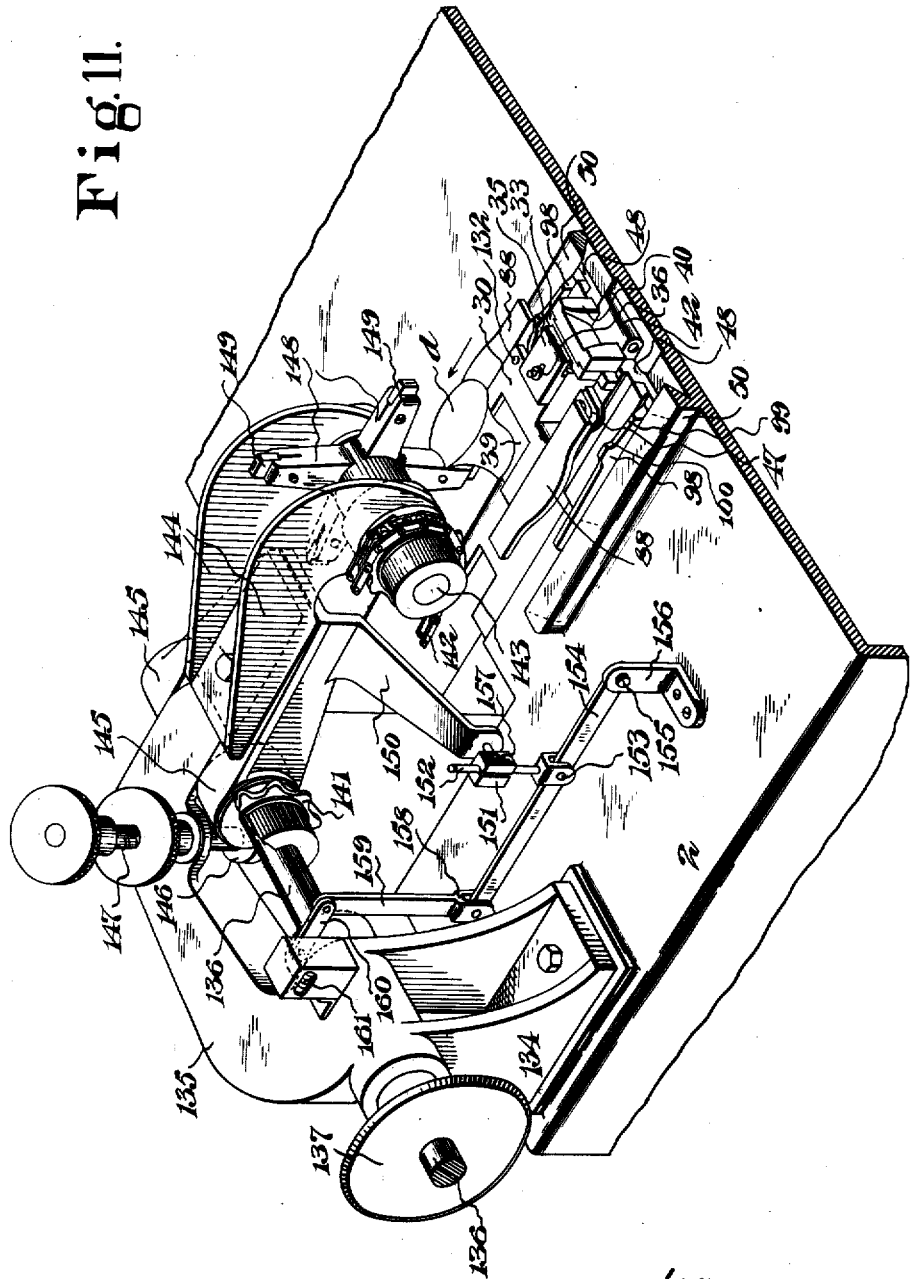
Fig. 11 is a detached perspective view showing the form of heel marker and counter.

A marker and counting mechanism is provided for marking the heels to indicate the size and style, and indicate the number of heels treated by the machine. One good form of marking and counting mechanism is indicated by Fig. 11, wherein a bracket 134 is secured to and rises from the machine frame 2 and carries a fixed arm 135. Mounted in the upper portion of the bracket 134 and a similar bearing on the remote end of the arm 135, is a shaft 136 carrying at its outer end a friction wheel or disk 137 which, as indicated in Fig. 2, may be frictionally engaged with a cooperating friction member 138 carried by a pinion 139 driven from the gear wheel 19. A hand wheel 140 serves to adjust the frictional contact between the members 137 and 138. The shaft 136 carries a sprocket wheel 141, Fig. 11, about which passes a sprocket chain 142 carried by the marker shaft 143 which is supported in the arms 144 loosely mounted by the hub portions 145 upon the shaft 136, the construction being such that the arms 144 may be raised when desired, by turning movement of the hub portions 145 upon the shaft 136 as an axis.
Extending from the hub portion 145 is a stop 146 adapted to engage the lower end of an adjustable pin 147 passing through the fixed arm 135, the construction being such that the operative position of the marker shaft 143, and, perforce the marker attached thereto, may be regulated as desired.

The marker, in the present instance, consists of the arms 148 mounted on the marker shaft 143, and each carrying at its end a marker 149 adapted to engage with the top or heel seat portion of the heel a as the latter is moved past the marker, as indicated in Fig. 11. The timing of the parts is such that as the heel approaches the marker, the marker is turned by the sprocket chain 142 and the marking end of one of the marker arms will be moved into contact with the top of the heel seat to impress the desired mark upon the heel, and at the same time the marker and the arms 144 in which it is mounted, will be lifted somewhat.

Extending from one of the arms 144 is a lug or arm 150, Fig. 11, carrying at its end a swivel block 151 through which passes a stem 152 connected at 153 to a lever 154 pivoted at 155 to a bracket 156 rising from the machine bed. The set screw 157 screws the stem 152 to the swivel block 151, the construction being such that each time the marker is lifted by the passing heel, the lever 154 will be correspondingly actuated. Pivotally connected at 158 to the lever 154 is a link 159, which, through an arm 160, actuates a counter 161 which may be of any usual or well known construction whereby the number of heels treated by the machine will be recorded and each heel will be impressed with the desired mark upon the heel seat to indicate its size and style.

Having thus described my invention, what I claim as new and desire to secure by Letters Patent of the United States is:—

1. In a machine for forming concaved heel seats in the heels of boots and shoes, the combination of cutters mounted to cut in a direction longitudinally of the top of the heel to successively concave separate portions extending from the breast to the back of the heel, and means for relatively traversing the cutters and heel during the operation of the cutters to cause them to act successively upon the heel.

2. In a machine for forming concaved heel seats in the heels of boots and shoes, the combination of cutters mounted to cut in a direction longitudinally of the top of the heel to successively concave separate portions extending from the breast to the back of the heel, and means for relatively traversing the cutters and heel in a direction longitudinally of the heel to cause each cutter to commence its longitudinal cut at the leading edge of the heel.

3. In a machine for forming concaved heel seats in the heels of boots and shoes, the combination of cutters mounted to cut in a direction longitudinally of the top of the heel to successively concave separate portions extending from the breast to the back of the heel, means for relatively traversing the cutters and heel, and means for feeding the heel breast foremost to cause each cutter to cut in a direction from the breast towards the back of the heel.

4. In a machine for forming concaved heel seats in the heels of boots and shoes, the combination of cutters supported to successively act upon the heel, one arranged to concave a portion of the top of the heel extending from breast to back and from one side edge towards the median longitudinal line of the top of the heel and another to concave a portion extending from breast to back and from the other side edge towards the median longitudinal line of the heel, and means for relatively moving the cutters and heels past each other during the cutting operation.

5. In a machine for forming concaved heel seats in the heels of boots and shoes, the combination of a cutter arranged to cut progressively in a direction longitudinally of the heel and concave a portion of the heel top extending from one edge towards the median longitudinal line of the heel, another cutter arranged to cut progressively in a direction longitudinally of the heel and concave another portion of the heel top extending from the other edge towards the median longitudinal line of the heel, and means for presenting a heel to the cutters.

6. In a machine for forming concaved heel seats in the heels of boots and shoes, the combination of a cutter mounted to concave a section of the top of a heel between the breast and back of the heel and extending from one side edge toward the median longitudinal line of the heel, another cutter mounted to concave the remaining section of the top of the heel, and means for relatively moving the cutters and heel to cause the cutters to cut in a direction longitudinally of the heel.

7. In a machine for forming concaved heel seats in wooden heels for boots and shoes, the combination of rotary cutters mounted to cut in a direction longitudinally of the top of the heel with the grain of the wood to successively remove sections of the heel top on opposite sides of the central longitudinal line of the heel, and means for presenting the heel to the cutters in succession.

8. In a machine for forming concaved heel seats in wooden heels, the combination of means for supporting and feeding heels for treatment, cutters arranged to act upon the top of a heel presented for treatment and successively remove different portions thereof at opposite sides of the median longitudinal line of the heel, and means for moving the supporting and feeding means to cause the heel to travel past the cutters in the direction of the grain of the wood.

9. In a machine for forming concaved heel seats in wooden heels for boots and shoes, the combination of a carrier for presenting the heel for treatment, cutters to act in succession upon the heels to concave different portions on opposite sides of the central longitudinal line of the heels and supported to cut longitudinally of the heel with the grain of the wood, means for securing the heels to the carrier, and means for operating the carrier.

10. In a machine for forming concaved heel seats in wooden heels, the combination of cutters arranged to act successively upon different portions of the top of a wooden heel and cut with the grain of the wood longitudinally of the heel, and means for presenting a heel for treatment.

11. In a machine for forming concaved heel seats in wooden heels, the combination of cutters arranged to act successively upon different portions of the top of a wooden heel and cut with the grain of the wood longitudinally of the heel, cutting portions of one cutter overlapping cutting portions of another cutter, and means for presenting a heel for treatment.

12. In a machine for forming heel seats in wooden heels for boots and shoes, the combination of two cutters to cut different portions of the top of a heel in the direction of the grain of the wood and supported with adjacent ends of the cutters in overlapping relation, and means for relatively moving the cutters and heel to cause the cutters to act longitudinally of the heel and successively concave portions of the heel extending from the breast to the back of the heel.

13. In a machine for forming heel seats in wooden heels for boots and shoes, the combination of two cutters that are arranged one in advance of the other to act successively upon the top of a heel, and means for moving the heels past the cutters in the direction of the grain of the wood that the cutters may cut with the grain, one of the cutters being supported to concave the top of a heel from one side edge to the longitudinal central line of the heel and the other cutter being supported to concave the remaining portion of the top of the heel.

14. In a machine for forming heel seats in wooden heels for boots and shoes, the combination of heel feeding means, cutters mounted to act upon different longitudinal portions of the top of a heel extending from the breast to the back of the heel, and means for automatically changing the relative lateral positions of the heel and cutters to cause the latter to conform the heel seat to the variations in width of heel from breast to back.

15. In a machine for forming heel seats in wooden heels for boots and shoes, the combination of cutters mounted to cut in a direction longitudinally of the top of a heel with the grain of the wood and concave separate portions extending from the breast to the back of the heel, means for relatively traversing the heel and cutters, and means for automatically moving the cutters laterally to conform to the variations of width of heel as the heel is traversed past the cutters.

16. In a machine for forming heel seats in wooden heels for boots and shoes, the combination of molded cutters that are supported to act upon different longitudinal portions of the top of a heel to concave the heel top by successively removing portions extending from the breast to the back of the heel, means for relatively traversing the heel and cutters, and means for relatively moving the heel and cutters laterally and heightwise of the heel during the action of the cutters.

17. In a machine for forming heel seats in wooden heels for boots and shoes, the combination of molded cutters that are supported to act upon different longitudinal portions of the top of a heel to concave the heel seat by the successive removal of separate portions extending from the breast to the back of the heel, a carrier for moving a heel past the cutters, and means for automatically moving the cutters laterally and in a direction heightwise of the heel as the latter is being moved past the cutters.

18. In a machine for forming heel seats in wooden heels for boots and shoes, the combination of molded cutters that are supported to act upon different longitudinal portions of the top of a heel to concave the heel seat by the successive removal of separate portions extending from the breast to the back of the heel, a carrier for moving a heel past the cutters, and means movable with the carrier for automatically moving the cutters laterally and in a direction heightwise of the heel as the latter is being moved past the cutters.

19. In a machine for forming heel seats in wooden heels for boots and shoes, the combination of molded cutters that are supported to act upon different longitudinal portions of the top of a heel to concave the heel seat by the successive removal of separate portions extending from the breast to the back of the heel, a carrier for moving a heel past the cutters with the heel breast foremost to cause the cutters to progressively cut longitudinally of the top of the heel from the breast toward the back, and means for varying the lateral and vertical relation of the heel and cutters during the cutting operation.

20. In a machine for forming heel seats in wooden heels for boots and shoes, the combination of molded cutters that are supported to act upon different longitudinal portions of the top of a heel to concave the heel seat by the successive removal of separate portions extending from the breast to the back of the heel, a carrier for moving a heel past the cutters, and means including a cam for moving the cutters in a direction towards and from the heel during the cutting operation.

21. In a machine for forming heel seats in wooden heels for boots and shoes, the combination of a carrier for presenting heels for treatment, two cutters mounted to act upon a heel from opposite sides of the path of feeding movement to successively concave different portions of the top of the heel extending from the breast to the back of the heel, and means for moving the cutters laterally and vertically during the operation of the cutters upon a heel.

22. In a machine for forming heel seats in wooden heels for boots and shoes, the combination of a carrier for feeding heels for treatment, two molded cutters that are supported to act upon different longitudinal portions of the top of a heel to concave the heel seat by the successive removal of separate portions extending from breast to back of the heel, means for moving the cutters laterally of the heel to cause the cuts to be made in predetermined relation to the side edges of the heel, and means for raising the cutters as they approach the back of the heel to cause the cuts to be made in predetermined relation to the edge about the back of the heel.

23. In a machine for forming heel seats in wooden heels for boots and shoes, the combination of a carrier for feeding heels for treatment, means on the carrier for securing heels thereto with the top or heel seat portion exposed, two molded cutters that are supported to act upon different longitudinal portions of the top of a heel to concave the heel seat by the successive removal of separate portions extending from breast to back of the heel, means for moving the cutters laterally of the heel to cause the cuts to be made in predetermined relation to the side edges of the heel, and means for raising the cutters as they approach the back of the heel to cause the cuts to be made in predetermined relation to the edge about the back of the heel.

24. In a machine for forming heel seats in wooden heels for boots and shoes, the combination of a carrier for feeding heels for treatment, clamps on the carrier for clamping the heels about the tread portion with the top or heel seat exposed, two molded cutters that are supported to act upon different longitudinal portions of the top of a heel to concave the heel seat by the successive removal of separate portions extending from breast to back of the heel, means for moving the cutters laterally of the heel to cause the cuts to be made in predetermined relation to the side edges of the heel, and means for raising the cutters as they approach the back of the heel to cause the cuts to be made in predetermined relation to the edge about the back of the heel.

25. In a machine for forming heel seats in wooden heels for boots and shoes, the combination of heel feeding means, cutters mounted to act upon different longitudinal portions of the top of a heel extending from the breast to the back of the heel, means for automatically changing the relative lateral positions of the heel and cutters to cause the latter to conform the heel seat to the variations in width of heel from breast to back, and means for manually adjusting the initial lateral relation of the heel and cutters.

26. In a machine for forming heel seats in wooden heels for boots and shoes, the combination of molded cutters that are supported to act upon different longitudinal portions of the top of a heel to concave the heel top by successively removing portions extending from the breast to the back of the heel, means for relatively traversing the heel and cutters, means for relatively moving the heel and cutters laterally and heighthwise of the heel during the action of the cutters, and means for manually adjusting the initial vertical relation of the heel and cutters.

27. A machine for forming concaved heel seats in wooden heels, comprising, in combination, a carrier for feeding and presenting heels for treatment, two molded cutters mounted to act successively upon different portions of the top of the heel at opposite sides of the central longitudinal line of the heel from the breast to the back of the heel, means for moving the cutters laterally of the heel during the cutting operation to conform the cut made by each to the varying width of the heel, and means for lifting the cutters clear of the heel as they move over the back edge of the heel.

28. A machine for forming concaved heel seats, comprising, in combination, two molded cutters mounted to successively cut different longitudinal portions of the top of a heel extending from the breast to the back of the heel, a carrier formed of jointed links adapted to engage one end of the heel between them and present the top or heel seat to the action of the cutters, and means for operating the carrier.

29. A machine for forming concaved heel seats, comprising, in combination, two molded cutters mounted to successively cut different longitudinal portions of the top of a heel extending from the breast to the back of the heel, a chain carrier, the adjacent ends of adjoining links having heel clamping portions to engage one end of a heel and present the top or heel seat to the action of the cutters, and means for operating the carrier.

30. A machine for forming concaved heel seats, comprising, in combination, two molded cutters mounted to successively cut different longitudinal portions of the top of a heel extending from the breast to the back of the heel, a chain carrier, the adjacent ends of adjoining links having heel clamping blocks, guides for deflecting the carrier and separating the adjoining links to permit one end of a heel to be inserted between the clamping blocks with the top or heel seat presented to the cutters, and straightening guides for the carrier acting to close the clamping blocks upon the heel.

31. A machine for forming concaved heel seats, comprising, in combination, two molded cutters mounted to successively cut different longitudinal portions of the top of a heel extending from the breast to the back of the heel, a chain carrier, the adjacent ends of adjoining links having heel clamping portions, one of which is yielding to engage and yieldingly clamp one end of a heel and present the top or heel seat to the action of the cutters, and means for operating the carrier.

32. A machine for forming concaved heel seats, comprising, in combination, two molded cutters mounted to successively cut different longitudinal portions of the top of a heel extending from the breast to the back of the heel, and a heel carrier formed of jointed links, the adjacent ends of adjoining links having changeable heel clamping portions to accommodate heels of different sizes and present the top or heel seat to the action of the cutters.

33. A machine for forming concaved heel seats, comprising, in combination, two molded cutters mounted to successively cut different longitudinal portions of the top of a heel extending from the breast to the back of the heel, a heel carrier formed of jointed links, the adjacent ends of adjoining links having portions to receive clamping blocks and a master heel for determining the size of the clamping blocks in response to the size of heels to be treated.

34. In a machine for forming heel seats in the top of heels, a heel carrier formed of jointed links, the adjacent ends of adjoining links having portions to receive clamping blocks, a master heel for determining the size of the clamping blocks in accordance with the size of the heels to be treated, and for predeterminately positioning the relation of the carrier and master heel for the reception of the clamping blocks.

35. In a machine of the class described, the combination of a heel carrier formed of connected links having clamps for holding heels and guided to travel in a rectilinear path during the treatment of the heels, two cutter heads mounted on horizontal axes above the heel carrier and arranged to cut different longitudinal portions of the top of a heel in a direction from front to rear of the heel, and means for automatically moving the cutter heads laterally and up and down during the cutting operation.

36. In a machine of the class described, the combination of a heel carrier formed of connected links having clamps for holding heels and guided to travel in a rectilinear path during the treatment of the heels, two cutter heads mounted on horizontal axes above the heel carrier and arranged to cut different longitudinal portions of the top of a heel in a direction from front to rear of the heel, and means actuated by the heel carrier for automatically moving the cutter heads laterally and up and down during the cutting operation.

37. In a machine of the class described, the combination of a heel carrier for presenting heels for treatment, two cutter heads mounted to rotate on horizontal axes and each to cut a different portion of the top of a heel from front to rear, means for supporting the cutter heads independently one ahead of the other to successively cut its respective portion of the top of a heel, and means for moving the cutter heads transversely and vertically relative to the heel during the operation of the cutters.

38. In a machine of the class described, the combination of a heel carrier for presenting heels for treatment, two cutter heads mounted to rotate on horizontal axes and each to cut a different portion of the top of a heel from front to rear, yokes for supporting the cutter heads on horizontal axes to cause them to act upon the heel successively from front to rear of the heel seat, and means for moving the cutter heads transversely and vertically during the cutting operation.

39. In a machine of the class described, the combination of a heel carrier for presenting heels for treatment, two cutter heads mounted to rotate on horizontal axes and each to cut a different portion of the top of a heel from front to rear, supports for the cutter heads mounted to move up and down, means for moving the cutter heads transversely on their supports, and means for automatically effecting the up and down and transverse movements of the cutter heads during the operation of the cutters.

40. In a machine of the class described, the combination of a heel carrier for presenting heels for treatment, two cutter heads mounted to rotate on horizontal axes and each to cut a different portion of the top of a heel from front to rear, supports for the cutter heads mounted to move up and down, means for moving the cutter heads transversely on their supports, means for automatically effecting the up and down and transverse movements of the cutter heads during the operation of the cutters, and manually controlled means for initially adjusting the alignment of the cutter heads.

41. In a machine of the class described, a conveyor arranged to hold blanks in position for treatment, a treating means arranged adjacent the path of feed of the conveyor to treat the blanks as they pass, a marking device for marking a desired legend on the treated blanks and moved by contact with the blanks as they pass in turn to effect the marking, and a counting device actuated by the movement of the marking device for ascertaining the number of blanks treated.

42. In a machine of the class described, a conveyor arranged to grasp and transport wooden heel blanks, a cutting instrumentality arranged adjacent the path of feed of the conveyor to shape the heel seats, a size marker comprising a hub and radiating arms arranged in the feeding path of the blanks, a member pivoted for vertical movement, on which the marker is mounted, and means for rotating the hub, whereby an arm will come in contact with a blank as it feeds and lift the marker and member riding over the blank and marking it.

43. In a machine of the class described, a conveyor arranged to grasp and transport wooden heel blanks, a cutting instrumentality arranged adjacent the path of feed of the conveyor to shape the heel seats, a size marker comprising a hub and radiating arms arranged in the feeding path of the blanks, a member pivoted for vertical movement, on which the marker is mounted, and means for rotating the hub, whereby an arm will come in contact with a blank as it feeds and lift the marker and member riding over the blank and marking it, and a counter operated by the movement of the member to register the number of blanks treated.

44. In a machine for operating upon heels, a heel carrier formed of jointed links, the adjacent ends of adjoining links being formed to receive clamping blocks arranged to hold the heels, a master heel for determining the location of the clamping blocks in accordance with the contour of the particular heel to be treated, and a jig having means for definitely relatively positioning the main frame, the carrier and the master heel to locate the clamping blocks properly.

45. In a machine for operating upon heels, a heel carrier formed of jointed links, the adjacent ends of adjoining links being formed to receive clamping blocks arranged to hold the heels, a master heel for determining the size of the clamping blocks in accordance with the contour of the particular heel to be treated, and an arm, there being provision for interfitting engagement between the arm and the master heel and carrier, respectively, to locate the clamping blocks properly.

46. In a machine for operating upon heels, a heel carrier formed of jointed links, the adjacent ends of adjoining links being formed to receive clamping blocks arranged to hold the heels, a master heel for determining the position of the clamping blocks in accordance with the contour of the particular heel to be treated, and an arm mounted on the main frame, and carrying means interfitting with the master heel and carrier to locate the clamping blocks properly, the interfitting means being separable while leaving the carrier and master heel in undisturbed relation, so that the master heel may be removed by flexing the joint between the two adjoining links without disturbance of the clamping blocks.

In testimony whereof I have signed my name to this specification.

LELAND B. WHIPPLE.

Certificate of Correction.

It is hereby certified that in Letters Patent No. 1,429,309, granted September 19, 1922, upon the application of Leland B. Whipple, of Rochester, New York, for an improvement in "Wood-Heel-Seating Machines," errors appear in the printed specification requiring correction as follows: Page 2, lines 52, 53, and 54, strike out the words " and automatically clamped in the carrier for treatment by the cutters"; same page, line 66, before the word "treated" insert the word *be;* page 3, line 106, for the word "in", first occurrence, read *and;* page 4, line 91, after the word "shaft" strike out the period and insert a comma; page 5, line 109, for the word "wheel" read *heel;* page 10, line 125, claim 34, after the word "and" insert the word *means;* and that the said Letters Patent should be read with these corrections therein that the same may conform to the record of the case in the Patent Office.

Signed and sealed this 26th day of December, A. D., 1922.

[SEAL.]                          KARL FENNING,
*Acting Commissioner of Patents.*